United States Patent
Lei et al.

(10) Patent No.: US 12,389,452 B2
(45) Date of Patent: Aug. 12, 2025

(54) METHOD AND APPARATUS FOR SHARING CHANNEL OCCUPANCY TIME ON UNLICENSED SPECTRUM

(71) Applicant: Lenovo (Beijing) Limited, Beijing (CN)

(72) Inventors: Haipeng Lei, Haidian District (CN); Alexander Golitschek Edler von Elbwart, Darmstadt (DE); Joachim Löhr, Wiesbaden (DE)

(73) Assignee: Lenovo (Beijing) Limited, Beijing (CN)

( * ) Notice: Subject to any disclaimer, the term of this patent is extended or adjusted under 35 U.S.C. 154(b) by 464 days.

(21) Appl. No.: 17/638,153

(22) PCT Filed: Sep. 30, 2019

(86) PCT No.: PCT/CN2019/109377
§ 371 (c)(1),
(2) Date: Feb. 24, 2022

(87) PCT Pub. No.: WO2021/062602
PCT Pub. Date: Apr. 8, 2021

(65) Prior Publication Data
US 2022/0304059 A1     Sep. 22, 2022

(51) Int. Cl.
*H04W 74/0816*     (2024.01)
*H04W 72/1268*     (2023.01)
(Continued)

(52) U.S. Cl.
CPC ... *H04W 74/0816* (2013.01); *H04W 72/1268* (2013.01); *H04W 72/23* (2023.01); *H04W 74/0866* (2013.01)

(58) Field of Classification Search
CPC ......... H04W 74/0816; H04W 72/1268; H04W 72/23; H04W 74/0866; H04W 72/56;
(Continued)

(56) References Cited

U.S. PATENT DOCUMENTS

2019/0268912 A1* 8/2019 Myung ................. H04L 1/1887
2020/0314899 A1* 10/2020 Sun ....................... H04L 5/0053
(Continued)

FOREIGN PATENT DOCUMENTS

WO     2018081101 A2     5/2018

OTHER PUBLICATIONS

"International Preliminary Report on Patentability", PCT Application No. PCT/CN2019/109377, Apr. 14, 2022, 5 pages.
(Continued)

*Primary Examiner* — Yaotang Wang
(74) *Attorney, Agent, or Firm* — FIG. 1 Patents

(57) ABSTRACT

The present application relates to a method and apparatus for sharing channel occupancy time. One embodiment of the subject application provides a method performed by a User Equipment (UE) for wireless communication, comprising: receiving, from a base station (BS), a first indicator requesting the UE to share a channel occupancy time (COT) for downlink transmission within the COT, wherein the COT is initiated by the UE for transmitting uplink data; determining a first channel access priority class (CAPC) value; initiating the COT by performing a channel access procedure using the first CAPC value; and transmitting, to the BS, at least a part of the uplink data in the COT.

20 Claims, 8 Drawing Sheets

(51) Int. Cl.
*H04W 72/23* (2023.01)
*H04W 74/08* (2024.01)

(58) Field of Classification Search
CPC .......... H04W 74/0808; H04W 74/004; H04W 74/08
See application file for complete search history.

(56) References Cited

U.S. PATENT DOCUMENTS

| | | | | |
|---|---|---|---|---|
| 2022/0150917 | A1* | 5/2022 | Wang | H04W 16/14 |
| 2024/0107585 | A1* | 3/2024 | Karaki | H04W 74/0816 |

OTHER PUBLICATIONS

"International Search Report and Written Opinion", PCT Application No. PCT/CN2019/109377, Jun. 23, 2020, 6 pages.
Intel Corporation, "Enhancements to configured grants for NR-unlicensed", 3GPP TSG RAN WG1 Meeting #97, R1-1906788, Reno, Nevada, USA [retrieved Apr. 13, 2022]. Retrieved from the Internet <https://www.3gpp.org/ftp/TSG_RAN/WG1_RL1/TSGR1_97/Docs/>., May 17, 2019, 11 pages.
Mediatek Inc., "On Channel Access Procedure", 3GPP TSG RAN WG1 #96bis, R1-1904482, Xi'an, China, Apr. 2019, 13 pages.
19947536.9, "Extended European Search Report", EP Application No. 19947536.9, Apr. 6, 2023, 12 pages.
VIVO, "Feature lead summary on Configured grant enhancement", 3GPP TSG RAN WG1#97, R1-1907670, Reno, USA [retrieved Apr. 26, 2023]. Retrieved from the Internet <https://www.3gpp.org/ftp/tsg_ran/WG1_RL1/TSGR1_97/ Docs>, May 2019, 28 pages.
201980100306.5, "Chinese Office Action", CN Application No. 201980100306.5, Apr. 1, 2024, 11 pages.
Interdigital, Inc., "Channel access in NR-U", 3GPP TSG RAN WG1 #98, R1-1909010, Prague, CZ, Aug. 26-30, 2019, Aug. 26, 2019, 4 pages.
201980100306.5, "Foreign Office Action", CN Application No. 201980100306.5, Sep. 12, 2024, 19 pages.
VIVO, "Discussion on the channel access procedures", 3GPP TSG RAN WG1#98, R1-1908140, Prague, CZ, Aug. 2019, 9 pages.

* cited by examiner

METHOD AND APPARATUS FOR SHARING CHANNEL OCCUPANCY TIME ON UNLICENSED SPECTRUM

TECHNICAL FIELD

The subject application relates to methods and apparatus for Generation Partnership Project (3GPP) network, especially to a method and apparatus for sharing channel occupancy time (COT) in NR network.

BACKGROUND OF THE INVENTION

Base stations (BSs) and user equipment (UE) may operate in both licensed and unlicensed spectrum. In long term evolution (LTE) Rel-15 further enhanced licensed assisted access (FeLAA), autonomous uplink (AUL) transmission is supported for unlicensed spectrum. In this way, UE can perform the physical uplink shared channel (PUSCH) transmission on the configured time-frequency resources without waiting for an uplink (UL) grant from the BS. Also, the BS can avoid transmitting UL grant and performing channel access procedure for transmitting the UL grant.

To improve the utilization of radio resource, a UE-initiated COT for AUL transmission can be shared with a base station for downlink (DL) transmission.

SUMMARY

It is desirable to provide a solution for sharing the COT in NR network.

One embodiment of the subject application provides a method performed by a user equipment (UE) for wireless communication. The method comprises: receiving, from a base station (BS), a first indicator requesting the UE to share a channel occupancy time (COT) for downlink transmission within the COT, wherein the COT is initiated by the UE for transmitting uplink data; determining a first channel access priority class (CAPC) value; initiating the COT by performing a channel access procedure using the first CAPC value; and transmitting, to the BS, at least a part of the uplink data in the COT.

Another embodiment of the subject application provides an apparatus comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor, the receiving circuitry and the transmitting circuitry to implement the above method.

Yet another embodiment of the subject application provides a method performed by a base station (BS) for wireless communication. The method comprises: transmitting, to a user equipment (UE), a first indicator requesting the UE to share a channel occupancy time (COT) for downlink transmission within the COT, wherein the COT is initiated by the UE for transmitting uplink data; and receiving, from the UE, the uplink data within the COT.

Still another embodiment of the subject application provides an apparatus comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor, the receiving circuitry and the transmitting circuitry to implement the above method.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for downlink (DL) or uplink (UL) data transmission on unlicensed spectrum. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
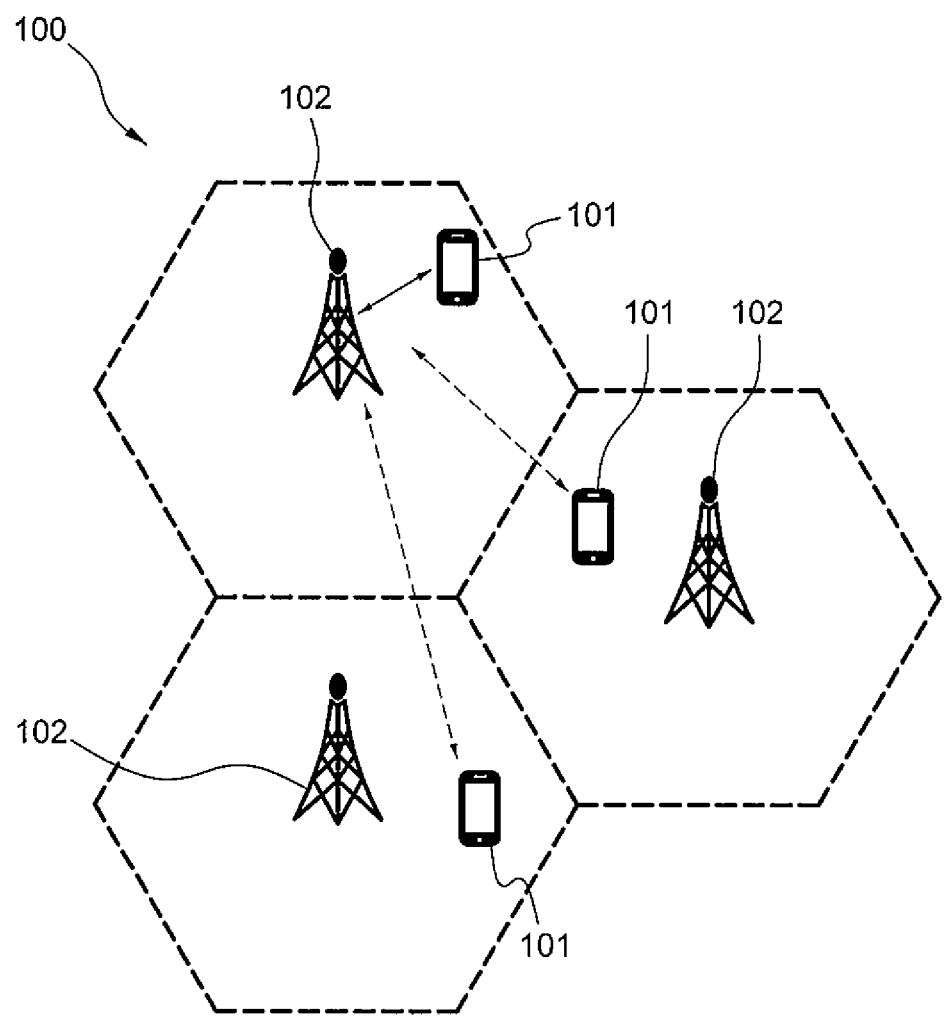
FIG. 1 illustrates a schematic diagram of a wireless communication system in accordance with some embodiments of the present application.

FIG. 1 depicts a wireless communication system 100 according to an embodiment of the present disclosure.

As shown in FIG. 1, the wireless communication system 100 includes UE 101 and BS 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a node-B, an enhanced node B (eNB), a gNB, a home node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an Orthogonal frequency division multiple access (OFDMA)-based network, an LTE network, a 3rd generation partnership project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the downlink and the UEs 101 transmit data on the uplink using discrete Fourier transform-spread-orthogonal frequency division multiplexing (DFT-S-OFDM) or cyclic prefix-orthogonal frequency division multiplexing (CP-OFDM) scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using the 3GPP 5G protocols.

In LTE Rel-15 FeLAA, autonomous uplink (AUL) transmission is supported over unlicensed spectrum, so that not only UE can transmit PUSCHs on the configured time-frequency resources without waiting for an UL grant but also eNB may skip the procedure of listen before talk (LBT) and the procedure of transmitting UL grant. Like semi-persistent scheduling (SPS) transmission, downlink control information (DCI) is needed for activation and deactivation of AUL transmission, and cyclic redundancy check (CRC) of the DCI is scrambled with a specific radio network temporary identity (RNTI), AUL C-RNTI. For AUL transmission, UE transmits AUL-UCI on the associated AUL PUSCH. The AUL-UCI includes 4-bit HARQ process ID, 1 or 2 bits NDI (1 bit for TM1, 2 bits for TM2), 2-bit RV, 16-bit UE-ID, 1-bit PUSCH starting point (indicating symbol 0 or 1), 1-bit PUSCH ending point (indicating symbol 12 or 13), 1-bit COT sharing, 16-bit CRC.

In LTE Rel-15 FeLAA, for AUL transmission, the UE uses Type 1 channel access procedure (also named LBT Cat.4) for transmitting AUL PUSCH and determines the channel access priority class (CAPC) value from Table 4.2.1-1 (reproduced below) in TS37.213 based on the UL traffic data. This mechanism is completely under network control since network maps logical channels to channel access priority class values. Moreover, if an AUL PUSCH falls inside of an eNB-initiated COT, whether the AUL PUSCH is allowed to be transmitted inside of the eNB-initiated COT is dependent on a one-bit COT sharing indicator in common physical data control channel (PDCCH) with CRC scrambled by CC-RNTI.

TABLE 4.2.1-1

Channel Access Priority Class for UL

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulm\ cot,p}$ = 6 ms.
NOTE 2:
When $T_{ulm\ cot,p}$ = 6 ms it may be increased to 8 ms by inserting one or more gaps. The minimum duration of a gap shall be 100 μs. The maximum duration before including any such gap shall be 6 ms.

If the one-bit COT sharing indicator is set to TRUE, then a UE can use channel access Type 2 for the AUL transmission corresponding to any priority class of the UL traffic data. If the one-bit COT sharing indicator is set to FALSE, then a UE shall not transmit the AUL transmission in the eNB-initiated COT.

Similarly, a UE-initiated COT by performing LBT Cat.4 for AUL transmission can be also shared with eNB for DL transmission. This permission of DL transmissions within a UE-initiated COT is indicated to eNB by a one-bit COT sharing indicator in AUL-UCI. If the one-bit COT sharing indicator is set to TRUE, it implies that UE intends to share its COT to eNB for DL transmission. If the one-bit COT sharing indicator is set to FALSE, it implies that UE does not intend to share its COT to eNB.

For NR-based access to unlicensed spectrum (NR-U), a UE-initiated COT for configured grant UL transmission can be shared with gNB for DL transmission. Generally, there are two mechanisms for UE and gNB to share the COT to each other, i.e., gNB-initiated COT to be shared with UE for scheduled PUSCH transmission and AUL PUSCH transmission, and UE-initiated COT for AUL PUSCH transmission can be shared with gNB for PDCCH transmission.

However, for UE-initiated COT sharing mechanism, it is purely dependent on UE's decision whether to share its COT with gNB for DL transmission, and which slots/symbols are shared with gNB if the UL-to-DL sharing is allowed. Obviously, during this procedure, network can't control this sharing. That is to say, when gNB has more urgent DL traffic data, or gNB needs to transmit periodic DL signals, e.g., synchronization signal (SS)/physical broadcast channel (PBCH), group-common PDCCH (GC-PDCCH), PDSCH carrying system information block 1 (SIB1), Msg.2/4, gNB has to wait for the AUL transmission and perform LBT Cat.4 after the completion of the AUL transmission. This UE-initiated COT sharing mechanism may lead to system performance degradation. In order to achieve more efficient spectrum usage, from system's perspective, gNB needs to have the influence on this UL-to-DL sharing and request the UE to share the UE-initiated COT for DL transmission as long as gNB needs to transmit more urgent DL traffic data.

One objective of this disclosure is to solve several issues to facilitate BS-controlled UL-to-DL sharing mechanism.

Figure 2:
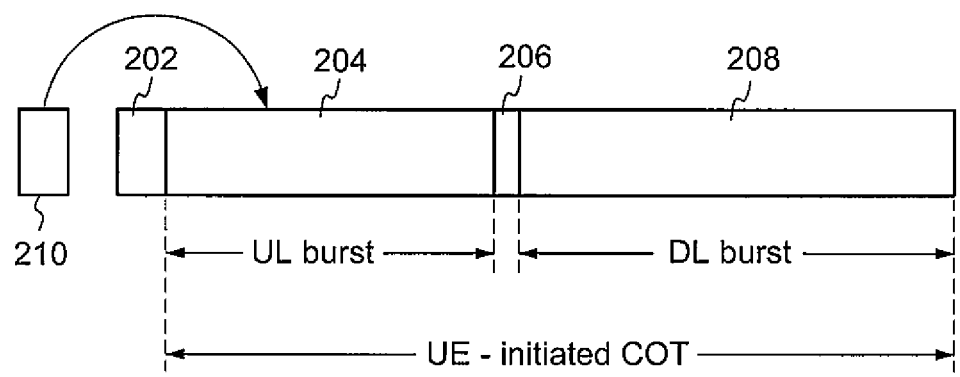
FIG. 2 illustrates a UE-initiated COT for scheduled PUSCH(s) according to some embodiments of the subject application.

Firstly, a mechanism for a BS to request a UE to share the UE-initiated COT for scheduled PUSCH transmission is provided, so that the BS may transmit DL transmission in the COT based on its own decision. FIG. 2 illustrates a UE-initiated COT for scheduled PUSCH(s) in according to some embodiments of the subject application. As depicted in FIG. 2, a COT is initiated by the UE through the LBT Cat. 4 procedure performed in time frame 202. After the PUSCH(s) scheduled by DCI 210 is transmitted in time frame 204, the time frame 208 is shared with a BS for transmitting DL transmission. The gap 206 between time frame 204 and time frame 208 is for the BS to perform LBT Cat. 2 procedure. That is, a number of symbols of scheduled PUSCH planned to be transmitted in gap 206 are blanked.

Figure 3:
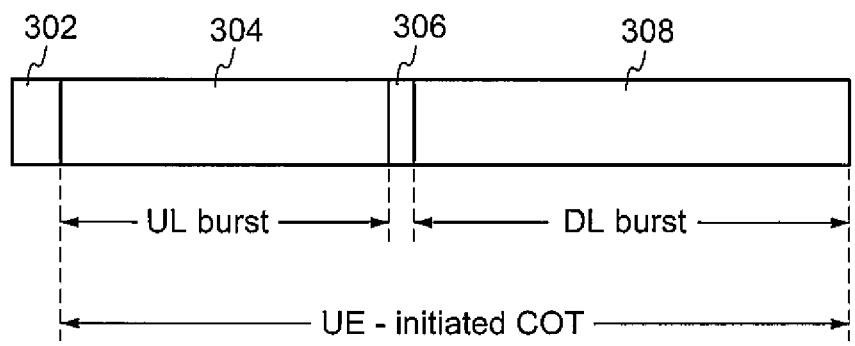
FIG. 3 illustrates a UE-initiated COT for configured grant PUSCH(s) according to some embodiments of the subject application.

Secondly, a mechanism for BS to request a UE to share the UE-initiated COT for configured grant PUSCH transmission is also provided in this disclosure. FIG. 3 illustrates a UE-initiated COT for configured grant PUSCH(s) in according to some embodiments of the subject application. As depicted in FIG. 3, a COT is initiated by the UE through the LBT Cat. 4 procedure performed in time frame 302. After the configured grant PUSCH(s) is transmitted in time frame 304, the time frame 308 is shared with a BS for transmitting DL transmission. The gap 306 between time frame 304 and time frame 308 is for the BS to perform LBT Cat. 2 procedure. That is, a number of symbols of configured grant PUSCH planned to be transmitted in gap 306 are blanked.

Figure 4:
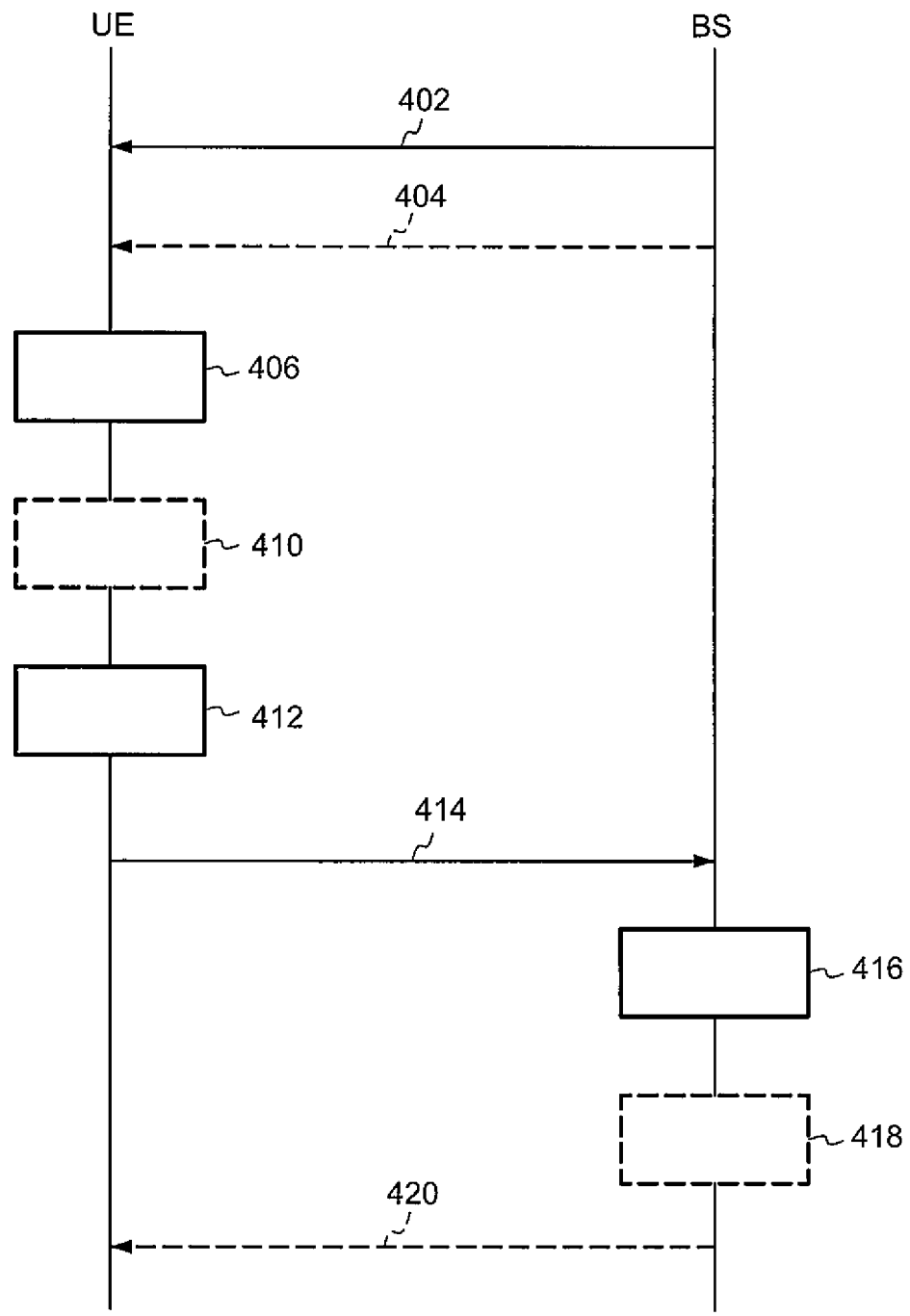
FIG. 4 illustrates a flow chart of an exemplary procedure for sharing a UE-initiated COT for scheduled PUSCH(s) with a base station according to some embodiments of the subject application.

FIG. 4 illustrates a flow chart of an exemplary procedure for sharing a UE-initiated COT for scheduled PUSCH(s) with a base station according to some embodiments of the subject application. The BS may, in operation 402, transmit a COT sharing requested indicator to the UE, so as to request the UE to share the UE-initiated COT with the BS for downlink transmission. In a preferred embodiment, the COT sharing requested indicator is a one-bit indicator included in a field of DCI, e.g., UL grant. It is contemplated that, the DCI is for scheduling one or more PUSCHs for transmitting the uplink data in the UE-initiated COT. Thus, the BS can dynamically request the UE to share the UE-initiated COT for downlink transmission. In addition, the UL grant may include a COT sharing indicator that indicates the BS-initiated COT is shared with the UE for PUSCH transmission.

In operation 404, the BS may transmit, to the UE, another indicator indicating a duration requested for the downlink transmission. In a preferred embodiment, this indicator can also be included in a field of the DCI. The requested duration can be indicated as the number of slots, or the number of symbols, or the combination of a number of slots and a number of symbols. In another embodiment, the duration requested for the downlink transmission may be configurable by RRC signaling. For instance, the requested duration may be determined from a candidate set consisting of, e.g., 2 symbols, 3 symbols, 4 symbols, 8 symbols and 12 symbols; 1 slot, 2 slots, 4 slots, 6 slots, and 8 slots, and so like.

In some embodiments, operation 404 may be omitted. For example, the duration for the downlink transmission may be preconfigured or fixed in the specification, and thus there is no need to transmit the indicator of requested DL duration to the UE.

Upon receipt the COT sharing requested indicator, the UE may, in operation 406, selects a CAPC value from a set of predefined CAPC values, e.g., CAPC values defined in Table 4.2.1-1 in TS37.213 mentioned above. In a preferred embodiment, the UE may select the CAPC value according to a sum of a duration required for transmitting the uplink data and the duration requested for the downlink transmission. The UE may firstly select the minimum MCOT which can accommodate both UL transmission and DL transmission from the set of predefined CAPC values, then further determine the CAPC value based on the Table 4.2.1-1 and the selected COT.

For example, if the duration required for transmitting the uplink data is 2 ms and the duration requested for the downlink transmission is 1 ms, the COT initiated by the UE should have at least 3 ms, so as to accommodate both the duration for UL transmission and the duration for DL transmission. As shown in Table 4.2.1-1, the CAPC value "1" corresponds to the maximum COT (MCOT) of 2 ms; the CAPC value "2" corresponds to the MCOT of 4 ms; the CAPC value "3" corresponds to the MCOT of 6 ms or 10 ms; and the CAPC value "4" also corresponds to the MCOT of 6 ms or 10 ms. Thus, the UE would select CAPC value "2" to perform the LBT Cat. 4 procedure, e.g., MCOT of 4 ms is selected, so as to ensure that the initiated COT may accommodate both the duration for UL transmission and the duration for DL transmission.

In another embodiment, the UE selects the CAPC value from a set of predefined CAPC values according to the uplink data. It is contemplated that the CAPC value may be selected based on the quality of service (QoS) requirement of the uplink data, i.e., the lowest channel access priority class (i.e. highest CAPC value) of the logical channel having data available for transmission. Since the requested duration for DL transmission does not influence the determination of the CAPC value, it may be not necessary to inform UE of the requested duration for DL transmission. Therefore, the operation 404 may be omitted in some embodiments.

In operation 410, the UE determines whether the MCOT of the selected CAPC value is sufficient to accommodate both the duration for UL transmission and the duration for DL transmission. Operation of 410 may be omitted if the COT is determined based on both the duration for UL transmission and the duration for DL transmission. If the COT is determined based on the UL transmission, operation 410 is preferred.

In operation 410, if the UE receive an indicator indicating the requested duration for DL transmission or the duration for DL transmission is preconfigured or fixed, the UE may determine whether the MCOT of the selected CAPC value is sufficient to accommodate both the duration for UL transmission and the duration for DL transmission in operation 410. Several options to determine how to distribute the COT are provided in this disclosure.

The first option is that the uplink data is prioritized. The UE firstly transmits all the scheduled PUSCH(s) then shares the remaining COT to the BS even if the duration of the remaining COT is shorter than the requested duration of the DL transmission.

The second option is that the BS decides which of the uplink data and the downlink transmission is prioritized. The BS may inform the UE of its decision with RRC signaling. Thus, if the duration of the COT is not long enough and the uplink data is prioritized, all the uplink data is to be transmitted in the COT and the remaining COT is shared with the BS; and if the duration of the COT is not long enough and the downlink transmission is prioritized, UE determines the duration for the uplink transmission by excluding the requested duration of DL transmission from the already determined UL MCOT. In this case, only a part of the uplink data is to be transmitted in the COT. In some embodiments, both of the first and second options are applied. If there is a conflict between these two options, BS may indicate which option to choose. Herein, the downlink transmission may include transmission of downlink data, downlink control (e.g., group common-PDCCH, periodic PDCCH, downlink feedback indication for UL configured grant transmission, or other UE-specific DCI, e.g., DL grant or UL grant), SS/PBCH block, SIB on PDSCH, periodic CSI-RS, etc.

The UE then performs LBT Cat. 4 procedure in operation 412 with the selected CAPC value, so as to initiate a COT for transmitting scheduled PUSCH(s). Afterward, the UE transmits the PUSCH(s) in the COT in operation 414. The remaining COT may be shared with the BS for DL transmission.

In operation 414, UE may transmit information addition to the uplink data to the BS. For example, the UE may transmit the selected CAPC value (hereinafter referred to as "UL CAPC value") to the BS. The UL CAPC value may be carried as uplink control information (UCI) on a scheduled PUSCH, e.g., the first or the last scheduled PUSCH, every scheduled PUSCH(s), or associated PUCCH.

A one-bit indicator may also be included in the UCI. The one-bit indicator is a COT sharing indicator indicating whether the UE agrees to share the COT. In another embodiment, a one-bit indicator included in the UCI may indicate whether the requested downlink duration can be accommodated in the COT. In yet another embodiment, a one-bit indicator included in the UCI may indicate whether the UL-to-DL sharing is successful since, in some cases, the UE could not follow the BS's request for COT sharing. In some embodiments, one or more of the above indicators and the UL CAPC value are separately indicated in the UCI. In some another embodiments, one or more of the above indicators are jointly coded with the UL CAPC value.

If the UL CAPC value is determined by using the Table 4.2.1-1, there are four candidate CAPC values. Thus, at least two bits are required to indicate one of the four candidate CAPC values. In one embodiment, these two bits are piggybacked on scheduled PUSCH(s) by puncturing certain resource elements (REs) immediately following the first DMRS for the PUSCH(s). In another embodiment, the two bits are multiplexed with uplink shared channel (UL-SCH) on the PUSCH(s), e.g., prepending the modulated symbols of the two bits at the beginning of modulated symbols of the UL-SCH, or including the two bits in MAC header or new MAC CE. In yet another embodiment, the two bits are carried in a PUCCH associated with the scheduled PUSCH(s). In this embodiment, PUCCH format 0 or 1 can be used to transmit the two bits.

After receiving the PUSCH(s) transmission, the BS determines whether the downlink data can be transmitted in UE-initiated COT in operation 416. The BS may determine whether the UE-initiated COT is shared with the BS based on the value of the COT sharing indicator included in the UCI. In some other embodiments, the BS may determine whether the downlink data can be transmitted in UE-initiated COT by comparing the received UL CAPC value and a DL CAPC value for downlink data. The DL CAPC value may be selected based on the QoS requirement of the downlink data. If the DL CAPC value is lower or equal to the UL CAPC value, then the downlink data is allowed to be transmitted in the UE-initiated COT. If the DL CAPC value is higher than the UL CAPC value, then the downlink data is not allowed to be transmitted in the UE-initiated COT.

In some embodiments, the BS transmits the downlink data in the UE-initiated COT without comparing the UL CAPC value and the DL CAPC value. If so, it is not necessary for the UE to transmit the UL CAPC to the BS. In some cases, the reporting of the UL CAPC value is not be supported; the UE does not report the UL CAPC value to BS; or the BS does not successfully receive the UL CAPC value from the UE. If so, the BS at least may transmit downlink signals with the lowest CAPC value (e.g., SS/PBCH, GC-PDCCH, SIB on PDSCH, periodic PDCCH, periodic CSI-RS, downlink feedback indication for UL configured grant transmission, or other UE-specific DCI, e.g., DL grant or UL grant). It is a reasonable presumption that the above DL transmission has comparably short duration. The duration of the above DL transmission plus the duration of scheduled PUSCH(s) does not exceed the MCOT corresponding to the lowest CAPC value, e.g., MCOT of 2 ms for CAPC value of 1.

If the downlink data is to be transmitted in the UE-initiated COT, the BS performs LBT Cat. 2 procedure in operation 418. The LBT Cat. 2 procedure is simpler than of LBT Cat. 4 procedure, thus the BS may use less time to complete the LBT procedure. Please refer to FIG. 2 again. As depicted in FIG. 2, the gap 206 between time frame 204 and time frame 208 is for the BS to perform LBT Cat. 2 procedure, and thus the gap 206 can be seen as a UL-to-DL switching point. Generally, the gap 206 would not be shorter than 25 us or 16 us, so as to perform LBT Cat.2 with 25 us sensing interval or with 16 us sensing interval. The exact number of blanked symbols is dependent on the subcarrier spacing. If 15 kHz subcarrier spacing or 30 kHz subcarrier spacing is applied, at least the last one symbol of the last PUSCH is blanked for the BS to perform LBT Cat.2. If 60 kHz subcarrier spacing is applied, at least the last two symbols of the last PUSCH are blanked. If 120 kHz subcarrier spacing is applied, at least the last four symbols of the last PUSCH are blanked. After completing the LBT procedure, the BS transmits the downlink data in operation 420.

It is contemplated that sequence for performing the operations 402-420 is not limited in the embodiments shown in FIG. 4. For example, the operation 410 may be performed after the operation 412 is completed. Persons with ordinary skills in the art may change the sequence of the operations 402-420 based on design choices. Persons with ordinary skills in the art may also delete some operations shown in FIG. 4, especially one or more operations drawn with dotted line, so as to enhance the time-efficiency, reduce the system workload or for other purposes.

Figure 5:
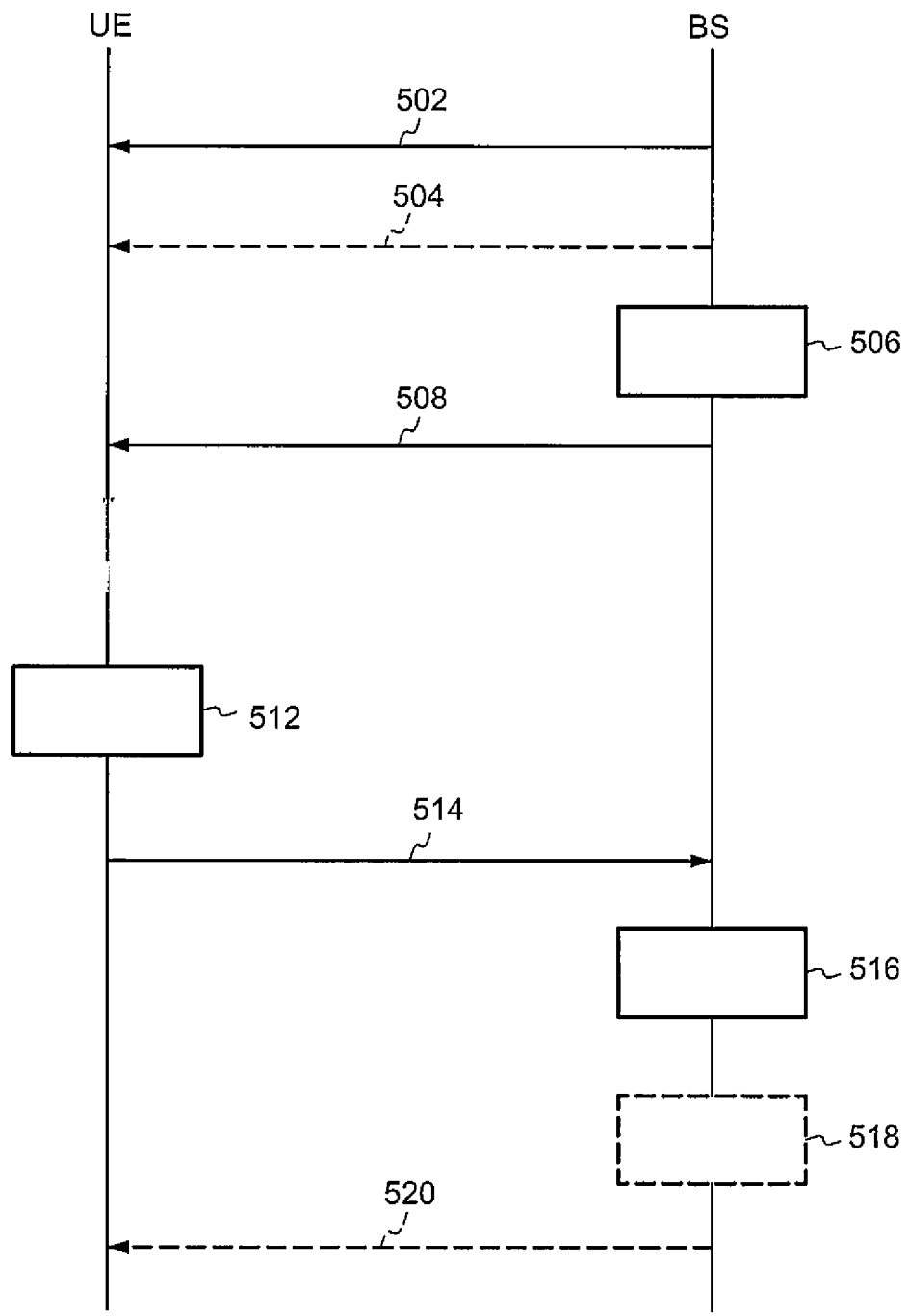
FIG. 5 illustrates a flow chart of another exemplary procedure for sharing a UE-initiated COT for scheduled PUSCH(s) with a base station according to some embodiments of the subject application.

FIG. 5 illustrates a flow chart of an exemplary procedure for sharing a UE-initiated COT for scheduled PUSCH(s) with a base station according to some embodiments of the subject application. The operations in FIG. 5 are similar to those in FIG. 4, except that the UL CAPC value is determined by the BS instead of the UE.

The BS may, in operation 502, transmit a COT sharing requested indicator to the UE, so as to request the UE to share the UE-initiated COT with the BS for downlink transmission. In a preferred embodiment, the COT sharing requested indicator is a one-bit indicator included in a field of DCI, e.g., UL grant. It is contemplated that, the DCI is for scheduling one or more PUSCHs for transmitting the uplink data in the UE-initiated COT. Thus, the BS can dynamically request the UE to share the UE-initiated COT for downlink transmission.

In operation 504, the BS may transmit, to the UE, another indicator indicating a duration requested for the downlink transmission. In a preferred embodiment, this indicator can also be included in a field of the DCI. The requested duration can be indicated as the number of slots, or the number of symbols, or the combination of a number of slots and a number of symbols. In another embodiment, the duration requested for the downlink transmission may be configurable by RRC signaling. For instance, the requested duration may be determined from a candidate set consisting of, e.g., 2 symbols, 3 symbols, 4 symbols, 8 symbols and 12 symbols; 1 slot, 2 slots, 4 slots, 6 slots, and 8 slots, and so like.

In some embodiments, operation 504 may be omitted. For example, the duration for the downlink transmission may be preconfigured or fixed in the specification, and thus there is no need to transmit the indicator of requested DL duration to the UE.

The BS may, in operation 506, selects a UL CAPC value from a set of predefined CAPC values, e.g., CAPC values defined in Table 4.2.1-1 in TS37.213 mentioned above. In a preferred embodiment, the BS may select the UL CAPC value according to a sum of a duration required for transmitting the uplink data and the duration requested for the downlink transmission. The BS may firstly select the minimum MCOT which can accommodate both UL transmission and DL transmission from the set of predefined CAPC values, then further determine the UL CAPC value based on the Table 4.2.1-1 and the selected COT.

For example, if the duration required for transmitting the uplink data is 2 ms and the duration requested for the downlink transmission is 1 ms, the COT initiated by the UE have at least 3 ms, so as to accommodate both the duration for UL transmission and the duration for DL transmission. As shown in Table 4.2.1-1, the CAPC value "1" corresponds to the maximum COT (MCOT) of 2 ms; the CAPC value "2" corresponds to the MCOT of 4 ms; the CAPC value "3" corresponds to the MCOT of 6 ms or 10 ms; and the CAPC value "4" also corresponds to the MCOT of 6 ms or 10 ms. Thus, the BS would select CAPC value "2" to perform the LBT Cat. 4 procedure, e.g., MCOT of 4 ms is selected, so as to ensure that the initiated COT may accommodate both the duration for UL transmission and the duration for DL transmission.

The BS then transmits the selected UL CAPC value to the UE in operation 508. The selected UL CAPC value may be included in a field of DCI, e.g., UL grant, for scheduling one or more PUSCHs for transmitting the uplink data in the UE-initiated COT. In some embodiments, the UL CAPC value may be transmitted to the UE in the same DCI as that for transmitting the COT sharing requested indicator. In this case, the operation 502 for transmitting the COT sharing requested indicator and operation 508 for transmitting the UL CAPC value may be combined.

After receiving of the COT sharing requested indicator and the UL CAPC value, the UE performs LBT Cat. 4 procedure in operation 512 with the received CAPC value, so as to initiate a COT for transmitting scheduled PUSCH(s). Afterward, the UE transmits the PUSCH(s) in the COT in operation 514. The remaining COT may be shared with the BS for DL transmission.

In operation 514, UE may transmit information in addition to the uplink data to the BS. A one-bit indicator may also be included in the UCI. The one-bit indicator is a COT sharing indicator indicating whether the UE agrees to share the COT. In yet another embodiment, a one-bit indicator included in the UCI may indicate whether the UL-to-DL sharing is successful since, in some cases, the UE could not follow the BS's request for sharing COT.

After receiving the PUSCH(s) transmission, the BS determines whether the downlink data can be transmitted in UE-initiated COT in operation 516. The BS may determine whether the UE-initiated COT is shared with the BS based on the value of the COT sharing indicator received in operation 514. In some other embodiments, the BS may determine whether the downlink data can be transmitted in UE-initiated COT by comparing the UL CAPC value and a DL CAPC value for downlink data. The DL CAPC value may be selected based on the QoS requirement of the downlink data. If the DL CAPC value is lower or equal to the UL CAPC value, then the downlink data is allowed to be transmitted in the UE-initiated COT. If the DL CAPC value is higher than the UL CAPC value, then the downlink data is not allowed to be transmitted in the UE-initiated COT.

In some embodiments, the BS transmits the downlink data in the UE-initiated COT without comparing the UL CAPC value and the DL CAPC value. The BS may transmit at least downlink signals with the lowest CAPC value (e.g., SS/PBCH, GC-PDCCH, SIB on PDSCH, periodic PDCCH, periodic CSI-RS, downlink feedback indication for UL configured grant transmission, or other UE-specific DCI, e.g., DL grant or UL grant). It is a reasonable presumption that the above DL transmission has comparably short duration. The duration for transmitting the above signals plus the scheduled PUSCH duration does not exceed the MCOT corresponding to the lowest CAPC value, e.g., MCOT of 2 ms for CAPC value of 1.

If the downlink data is to be transmitted in the UE-initiated COT, the BS performs LBT Cat. 2 procedure in operation 518. The LBT Cat. 2 procedure is simpler than of LBT Cat. 4 procedure, thus the BS may use less time to complete the LBT procedure. Please refer to FIG. 2 again. As depicted in FIG. 2, the gap 206 between time frame 204 and time frame 208 is for the BS to perform LBT Cat. 2 procedure, and thus the gap 206 can be seen as a UL-to-DL switching point. Generally, the gap 206 would not be shorter than 25 us or 16 us, so as to perform LBT Cat.2 with 25 us sensing interval or with 16 us sensing interval. The exact number of blanked symbols is dependent on the subcarrier spacing. If 15 kHz subcarrier spacing or 30 kHz subcarrier spacing is applied, at least the last one symbol of the last PUSCH is blanked for the BS to perform LBT Cat.2. If 60 kHz subcarrier spacing is applied, at least the last two symbols of the last PUSCH are blanked. If 120 kHz subcarrier spacing is applied, at least the last four symbols of the last PUSCH are blanked. After completing the LBT procedure, the BS transmits the downlink data in operation 520.

It is contemplated that sequence of operations 502-520 is not limited in the embodiments shown in FIG. 5. For example, operation 504 may be performed after operation 508; and operation 516 may be performed earlier, e.g., before operation 508 or 514. Persons with ordinary skills in the art may change the sequence of operations 502-520 based on design choices. Persons with ordinary skills in the art may also delete some operations shown in FIG. 5, especially one or more operations drawn with dotted line, or combine some operations, e.g., operation 502 and 508, so as to enhance the time-efficiency, reduce the system workload or for other purposes.

Figure 6:
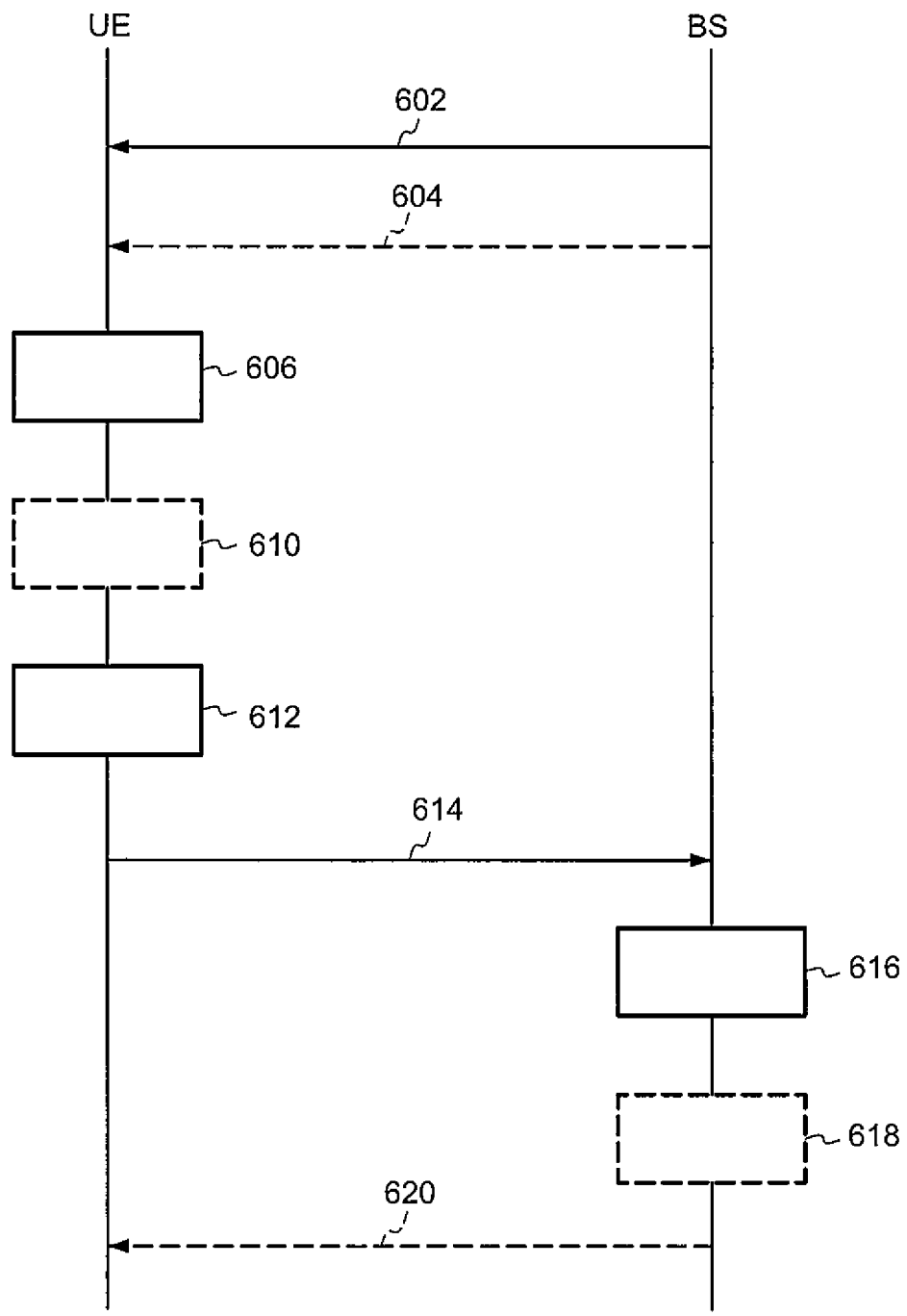
FIG. 6 illustrates a flow chart of an exemplary procedure for sharing a UE-initiated COT for configured grant PUSCH(s) with a base station according to some embodiments of the subject application.

FIG. 6 illustrates a flow chart of an exemplary procedure for sharing a UE-initiated COT for configured grant PUSCH(s) with a base station according to some embodiments of the subject application. The BS may, in operation 602, transmit a COT sharing requested indicator to the UE, so as to request the UE to share the UE-initiated COT with the BS for downlink transmission. In a preferred embodiment, the COT sharing requested indicator is a one-bit indicator included in downlink feedback information (DFI) corresponding to one or more configured grant PUSCHs for transmitting the uplink data. In another embodiment, the COT sharing requested indicator may be included in DCI for activating the one or more configured grant PUSCHs for transmitting the uplink data. The DCI has CRC scrambled by CS-RNTI for configured grant Type 2. In yet another embodiment, the COT sharing requested indicator may be configured by a radio resource control (RRC) signaling. Thus, the BS can dynamically or semi-statically request the UE to share the UE-initiated COT for downlink transmission.

In operation 604, the BS may transmit, to the UE, another indicator indicating a duration requested for the downlink transmission. In a preferred embodiment, this indicator can also be included in DFI corresponding to one or more configured grant PUSCHs for transmitting the uplink data or DCI for activating the one or more configured grant PUSCHs for transmitting the uplink data. The requested duration can be indicated as the number of slots, or the number of symbols, or the combination of a number of slots and a number of symbols. In another embodiment, the duration requested for the downlink transmission may be configurable by RRC signaling. For instance, the requested duration may be determined from a candidate set consisting of, e.g., 2 symbols, 3 symbols, 4 symbols, 8 symbols and 12 symbols; 1 slot, 2 slots, 4 slots, 6 slots, and 8 slots, and so like.

In some embodiments, operation 604 may be omitted. For example, the duration for the downlink transmission may be preconfigured or fixed in the specification, and thus there is no need to transmit the indicator of requested DL duration to the UE.

Upon receipt the COT sharing requested indicator, the UE may, in operation 606, selects a CAPC value from a set of predefined CAPC values, e.g., CAPC values defined in Table 4.2.1-1 in TS37.213 mentioned above. In a preferred embodiment, the UE may select the CAPC value according to a sum of a duration required for transmitting the uplink data and the duration requested for the downlink transmission. The UE may firstly select the minimum MCOT which can accommodate both UL transmission and DL transmission from the set of predefined CAPC values, then further determine the CAPC value based on the Table 4.2.1-1 and the selected COT.

In another embodiment, the UE selects the CAPC value from a set of predefined CAPC values according to the uplink data. It is contemplated that the CAPC value may be selected based on the quality of service (QoS) requirement of the uplink data, i.e., the lowest channel access priority class (i.e. highest CAPC value) of the logical channel having data available for transmission. Since the requested duration for DL transmission does not influence the determination of the CAPC value, it may be not necessary to inform UE of the requested duration for DL transmission. Therefore, the operation 604 may be omitted in some embodiments.

In operation 610, the UE determines whether the MCOT of the selected CAPC value is sufficient to accommodate both the duration for UL transmission and the duration for DL transmission. Operation of 610 may be omitted if the COT is determined based on both the duration for UL transmission and the duration for DL transmission. If the COT is determined based on the UL transmission, operation 610 is preferred.

In operation 610, if the UE receive an indicator indicating the requested duration for DL transmission or the duration for DL transmission is preconfigured or fixed, the UE may determine whether the MCOT of the selected UL CAPC value is sufficient to accommodate both the duration for UL transmission and the duration for DL transmission in operation 610. If the MCOT of the selected UL CAPC value is not sufficient to accommodate both the duration for UL transmission and the duration for DL transmission, the UE may adjust the duration for configured grant PUSCH(s). Alternatively, the UE may transmits all the configured grant PUSCH(s) then shares the remaining COT to the BS even if the duration of the remaining COT is shorter than the requested duration of the DL transmission. The mechanisms of determining how to distribute the COT to uplink data and downlink data are similar to those for the embodiments in FIG. 4, and thus are omitted here.

The UE then performs LBT Cat. 4 procedure in operation 612 with the selected UL CAPC value, so as to initiate a COT for transmitting configured grant PUSCH(s). Afterward, the UE transmits the PUSCH(s) in the COT in operation 614. The remaining COT may be shared with the BS for DL transmission.

In operation 614, UE may transmit information in addition to the uplink data to the BS. For example, the UE may transmit the selected UL CAPC value (hereinafter referred to as "UL CAPC value") to the BS. The UL CAPC value may be carried as uplink control information (UCI) on one configured grant PUSCH, e.g., the first or the last configured grant PUSCH, every configured grant PUSCH(s), or associated PUCCH.

A one-bit indicator may also be included in the UCI. The one-bit indicator is a COT sharing indicator indicating whether the UE agrees to share the COT. In another embodiment, a one-bit indicator included in the UCI may indicate whether the requested downlink duration can be accommodated in the COT. In yet another embodiment, a one-bit indicator included in the UCI may indicate whether the UL-to-DL sharing is successful since, in some cases, the UE could not follow the BS's request for COT sharing. In some embodiments, one or more of the above indicators and the UL CAPC value are separately indicated in the UCI. In some another embodiments, one or more of the above indicators are jointly coded with the UL CAPC value.

If the UL CAPC value is determined by using the Table 4.2.1-1, there are four candidate CAPC values. Thus, at least two bits are required to indicate one of the four candidate CAPC values. In one embodiment, these two bits are piggybacked on configured grant PUSCH(s) by puncturing certain resource elements (REs) immediately following the first DMRS for the PUSCH(s). In another embodiment, the two bits are multiplexed with uplink shared channel (UL-SCH) on the PUSCH(s), e.g., prepending the modulated symbols of the two bits at the beginning of modulated symbols of the UL-SCH, or including the two bits in MAC header or new MAC CE. In yet another embodiment, the two bits are carried in a PUCCH following the configured grant PUSCH(s). In this embodiment, PUCCH format 0 or 1 can be used to transmit the two bits.

After receiving the PUSCH(s) transmission, the BS determines whether the downlink data can be transmitted in UE-initiated COT in operation 616. The BS may determine whether the UE-initiated COT is shared with the BS based on the value of the COT sharing indicator included in the UCI. In some other embodiments, the BS may determine whether the downlink data can be transmitted in UE-initiated COT by comparing the received UL CAPC value and a DL CAPC value for downlink data. The DL CAPC value may be selected based on the QoS requirement of the downlink data. If the DL CAPC value is lower or equal to the UL CAPC value, then the downlink data is allowed to be transmitted in the UE-initiated COT. If the DL CAPC value is higher than the UL CAPC value, then the downlink data is not allowed to be transmitted in the UE-initiated COT.

In some embodiments, the BS transmits the downlink data in the UE-initiated COT without comparing the UL CAPC value and the DL CAPC value. If so, it is not necessary for the UE to transmit the UL CAPC to the BS. In some cases, the reporting of the UL CAPC value is not be supported; the UE does not report the UL CAPC value to BS; or the BS does not successfully receive the UL CAPC value from the UE. If so, the BS at least may transmit downlink signals with the lowest CAPC value (e.g., SS/PBCH, GC-PDCCH, SIB on PDSCH, periodic PDCCH, periodic CSI-RS, downlink feedback indication for UL configured grant transmission, or other UE-specific DCI, e.g., DL grant or UL grant). It is a reasonable presumption that the above DL transmission has comparably short duration. The duration of the above DL transmission plus the duration of the configured grant PUSCH(s) does not exceed the MCOT corresponding to the lowest CAPC value, e.g., MCOT of 2 ms for CAPC value of 1.

If the downlink data is to be transmitted in the UE-initiated COT, the BS performs LBT Cat. 2 procedure in operation 618. The LBT Cat. 2 procedure is simpler than of LBT Cat. 4 procedure, thus the BS may use less time to complete the LBT procedure. Please refer to FIG. 3 again. As depicted in FIG. 3, the gap 306 between time frame 304 and time frame 308 is for the BS to perform LBT Cat. 2 procedure, and thus the gap 306 can be seen as a UL-to-DL switching point. Generally, the gap 306 would not be shorter than 25 us or 16 us, so as to perform LBT Cat.2 with 25 us sensing interval or with 16 us sensing interval. The exact number of blanked symbols is dependent on the subcarrier spacing. If 15 kHz subcarrier spacing or 30 kHz subcarrier spacing is applied, at least the last one symbol of the last PUSCH is blanked for the BS to perform LBT Cat.2. If 60 kHz subcarrier spacing is applied, at least the last two symbols of the last PUSCH are blanked. If 120 kHz subcarrier spacing is applied, at least the last four symbols of the last PUSCH are blanked. After completing the LBT procedure, the BS transmits the downlink data in operation 620.

It is contemplated that sequence for performing the operations 602-620 is not limited in the embodiments shown in FIG. 6. For example, the operation 610 may be performed after the operation 612 is completed. Persons with ordinary skills in the art may change the sequence of the operations 602-620 based on design choices. Persons with ordinary skills in the art may also delete some operations shown in FIG. 6, especially one or more operations drawn with dotted line, so as to enhance the time-efficiency, reduce the system workload or for other purposes.

Figure 7:
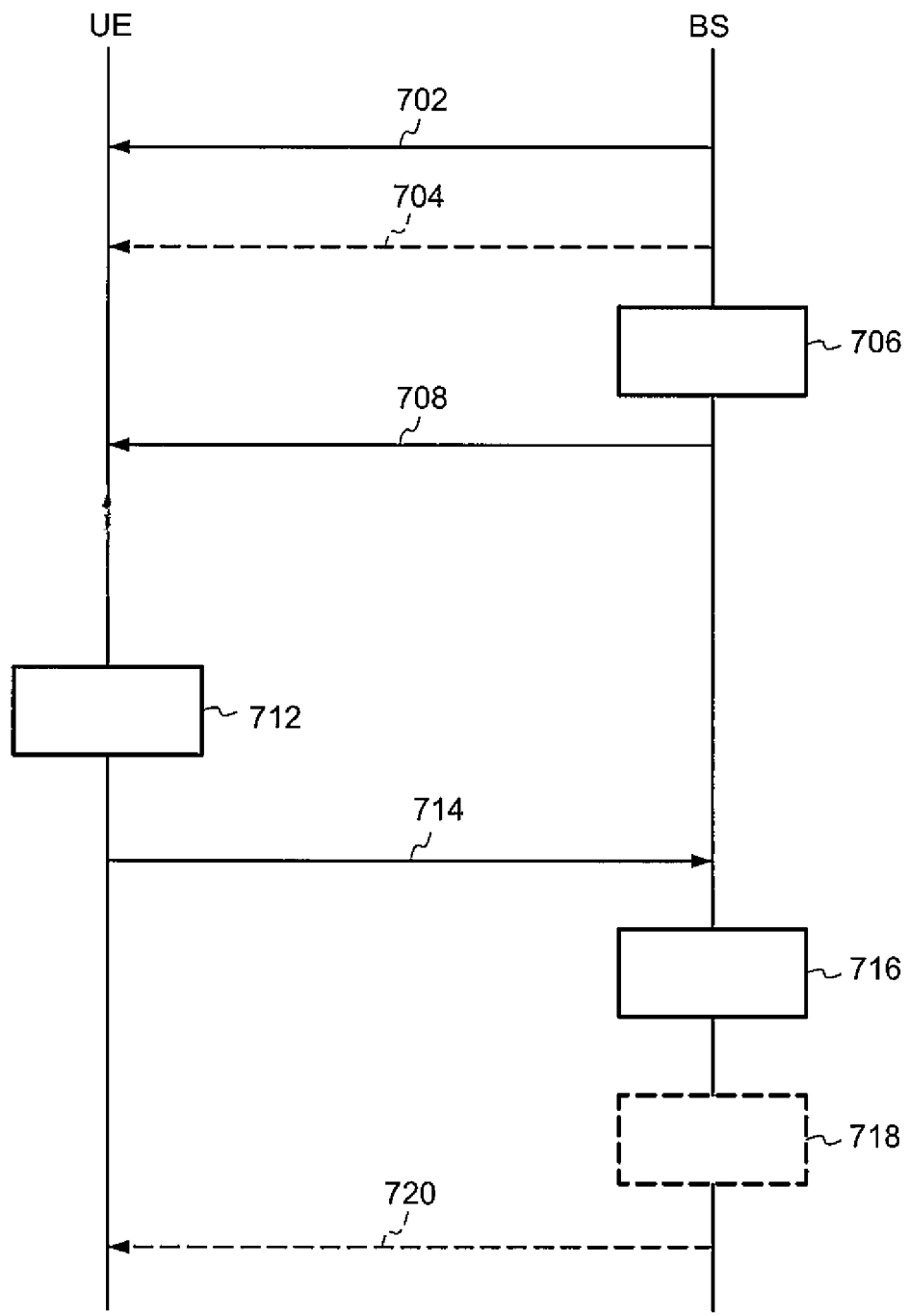
FIG. 7 illustrates a flow chart of another exemplary procedure for sharing a UE-initiated COT for configured grant PUSCH(s) with a base station according to some embodiments of the subject application.

FIG. 7 illustrates a flow chart of another exemplary procedure for sharing a UE-initiated COT for configured grant PUSCH(s) with a base station according to some embodiments of the subject application. The operations in FIG. 7 are similar to those in FIG. 6, except that the UL CAPC value is determined by the BS instead of the UE.

The BS may, in operation 702, transmit a COT sharing requested indicator to the UE, so as to request the UE to share the UE-initiated COT with the BS for downlink transmission. In a preferred embodiment, the COT sharing requested indicator is a one-bit indicator included in downlink feedback information (DFI) corresponding to one or more configured grant PUSCHs for transmitting the uplink data. In another embodiment, the COT sharing requested indicator may be included in DCI for activating the one or more configured grant PUSCHs for transmitting the uplink data. The DCI has CRC scrambled by CS-RNTI for configured grant Type 2. In yet another embodiment, the COT sharing requested indicator may be included in a radio resource control (RRC) signaling. Thus, the BS can dynamically or semi-statically request the UE to share the UE-initiated COT for downlink transmission.

In operation 704, the BS may transmit, to the UE, another indicator indicating a duration requested for the downlink transmission. In a preferred embodiment, this indicator can also be included in DFI corresponding to one or more configured grant PUSCHs for transmitting the uplink data. The requested duration can be indicated as the number of slots, or the number of symbols, or the combination of a number of slots and a number of symbols. In another embodiment, the duration requested for the downlink transmission may be configurable by RRC signaling. For instance, the requested duration may be determined from a candidate set consisting of, e.g., 2 symbols, 3 symbols, 4 symbols, 8 symbols and 12 symbols; 1 slot, 2 slots, 4 slots, 6 slots, and 8 slots, and so like.

In some embodiments, the operation 704 may be omitted. For example, the duration for the downlink transmission may be preconfigured or fixed in the specification, and thus there is no need to transmit the indicator of requested DL duration to the UE.

The BS may, in operation 706, selects a UL CAPC value from a set of predefined CAPC values, e.g., CAPC values defined in Table 4.2.1-1 in TS37.213 mentioned above. In a preferred embodiment, the UE may select the UL CAPC value according to a sum of a duration required for transmitting the uplink data and the duration requested for the downlink transmission. The BS may firstly select the minimum MCOT which can accommodate both UL transmission and DL transmission from the set of predefined CAPC values, then further determine the UL CAPC value based on the Table 4.2.1-1 and the selected COT.

The BS then transmits the selected UL CAPC value to the UE in operation 708. In one embodiment, the selected UL CAPC value may be included in a field of DFI corresponding to one or more configured grant PUSCHs for the UE to transmit the uplink data or DCI for activating the one or more configured grant PUSCHs for transmitting the uplink data. In some embodiments, the UL CAPC value may be transmitted to the UE in the same DFI as that for transmitting the COT sharing requested indicator. In this case, the operation 702 for transmitting the COT sharing requested indicator and operation 708 for transmitting the UL CAPC value may be combined. In another embodiment, the selected UL CAPC value may be configured by a radio resource control (RRC) signaling.

After receiving of the COT sharing requested indicator and the UL CAPC value, the UE then performs LBT Cat. 4 procedure in operation 712, so as to initiate a COT for transmitting configured grant PUSCH(s). Afterward, the UE transmits the PUSCH(s) in the COT in operation 714. The remaining COT may be shared with the BS for DL transmission.

In operation 714, UE may transmit information in addition to the uplink data to the BS. For example, a one-bit indicator may be transmitted along with the configured grant PUSCH. The one-bit indicator may be a COT sharing indicator indicating whether the UE agrees to share the COT. In another embodiment, a one-bit indicator included in the UCI may indicate whether the UL-to-DL sharing is successful since, in some cases, the UE could not follow the BS's request for sharing COT.

After receiving the PUSCH(s) transmission, the BS determines whether the downlink data can be transmitted in UE-initiated COT in operation 716. The BS may determine whether the UE-initiated COT is shared with the BS based on the value of the COT sharing indicator received in operation 714. In some other embodiments, the BS may determine whether the downlink data can be transmitted in UE-initiated COT by comparing the UL CAPC value and a DL CAPC value for downlink data. The DL CAPC value may be selected based on the QoS requirement of the downlink data. If the DL CAPC value is lower or equal to the UL CAPC value, then the downlink data is allowed to be transmitted in the UE-initiated COT. If the DL CAPC value is higher than the UL CAPC value, then the downlink data is not allowed to be transmitted in the UE-initiated COT.

In some embodiments, the BS transmits the downlink data in the UE-initiated COT without comparing the UL CAPC value and the DL CAPC value. The BS at least may transmit downlink signals with the lowest CAPC value (e.g., SS/PBCH, GC-PDCCH, SIB on PDSCH, periodic PDCCH, periodic CSI-RS, downlink feedback indication for UL configured grant transmission, or other UE-specific DCI, e.g., DL grant or UL grant). It is a reasonable presumption that the above DL transmission has comparably short duration. The duration for transmitting the above signals plus the configured grant PUSCH duration does not exceed the MCOT corresponding to the lowest CAPC value, e.g., MCOT of 2 ms for CAPC value of 1.

If the downlink data is to be transmitted in the UE-initiated COT, the BS performs LBT Cat. 2 procedure in operation 718. The LBT Cat. 2 procedure is simpler than of LBT Cat. 4 procedure, thus the BS may use less time to complete the LBT procedure. Please refer to FIG. 3 again. As depicted in FIG. 3, the gap 306 between time frame 304 and time frame 308 is for the BS to perform LBT Cat. 2 procedure, and thus the gap 306 can be seen as a UL-to-DL switching point. Generally, the gap 306 would not be shorter than 25 us or 16 us, so as to perform LBT Cat.2 with 25 us sensing interval or with 16 us sensing interval. The exact number of blanked symbols is dependent on the subcarrier spacing. If 15 kHz subcarrier spacing or 30 kHz subcarrier spacing is applied, at least the last one symbol of the last PUSCH is blanked for the BS to perform LBT Cat.2. If 60 kHz subcarrier spacing is applied, at least the last two symbols of the last PUSCH are blanked. If 120 kHz sub-carrier spacing is applied, at least the last four symbols of the last PUSCH are blanked. After completing the LBT procedure, the BS transmits the downlink data in operation 720.

It is contemplated that sequence of operations 702-720 is not limited in the embodiments shown in FIG. 7. For example, operation 704 may be performed after operation 708; and operation 716 may be performed earlier, e.g., before operation 708 or 714. Persons with ordinary skills in the art may change the sequence of operations 702-720 based on design choices. Persons with ordinary skills in the art may also delete some operations shown in FIG. 5, especially one or more operations drawn with dotted line, or combine some operations, e.g., operation 702 and 708, so as to enhance the time-efficiency, reduce the system workload or for other purposes.

Figure 8:
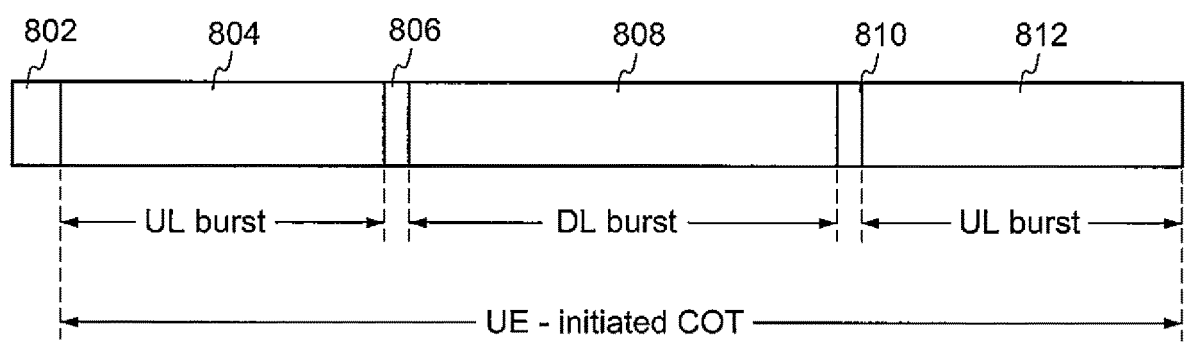
FIG. 8 illustrates a UE-initiated COT with both UL-to-DL switching point and DL-to-UL switching point according to some embodiments of the subject application.

It is contemplated that there may be both UL-to-DL switching point and DL-to-UL switching point in a UE-initiated COT. FIG. 8 illustrates a UE-initiated COT for scheduled PUSCHs or configured grant PUSCH having both a UL-to-DL switching point and a DL-to-UL switching point according to some embodiments of the subject application. In FIG. 8, the gap 806 between time frame 804 and time frame 808 is for the BS to perform LBT Cat. 2 procedure, and the gap 810 between time frame 808 and time frame 812 is for the UE to perform LBT Cat. 2 procedure.

The two UL-DL switching points are useful in at least two cases. In the first case, when the BS requests shared resource just for transmitting periodic DL signals/channels, the UE can use the remaining COT after the BS finishes the transmission of the periodic DL signals/channels. In the second case, after the BS finishes transmitting PDCCH and PDSCH in the UE-initiated COT, the UE can use the remaining COT to transmit HARQ feedback corresponding to the received PDSCH. It is contemplated that the UE-initiated COT may include one or more DL-to-UL switching points and one or more UL-to-DL switching point and thus is not limited by the embodiments shown in FIG. 8.

Figure 9:
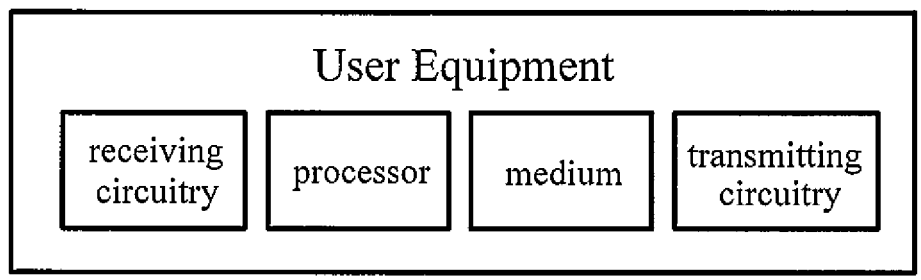
FIG. 9 illustrates a block diagram of a UE according to some embodiments of the present disclosure.

FIG. 9 illustrates a block diagram of a UE according to the embodiments of the present disclosure. The UE may include a receiving circuitry, a processor, and a transmitting circuitry. In one embodiment, the UE further includes a non-transitory computer-readable medium having stored thereon computer-executable instructions. The processor is coupled to the non-transitory computer-readable medium, the receiving circuitry and the transmitting circuitry. The computer-executable instructions can be programmed to implement operations (e.g. operations performed by UE in any of FIGS. 4-7) with the receiving circuitry, the transmitting circuitry and the processor. That is, upon performing the computer-executable instructions, the receiving circuitry may receive, from a BS, a first indicator requesting the UE to share a COT for downlink transmission within the COT, wherein the COT is initiated by the UE for transmitting uplink data; the processor may determine a first CAPC value and initiate the COT by performing a channel access procedure using the first CAPC value; and the transmitting circuitry may transmit, to the BS, at least a part of the uplink data in the COT.

Figure 10:
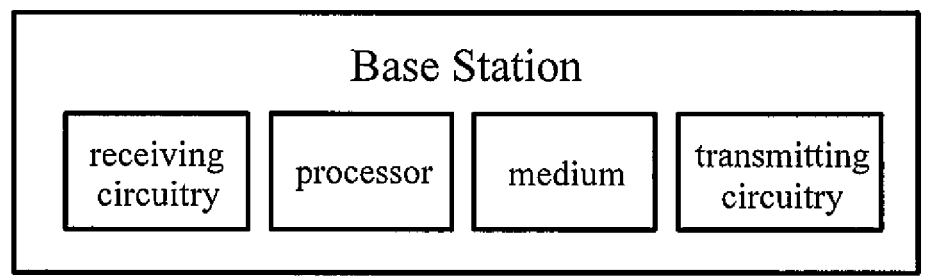
FIG. 10 depicts a block diagram of a BS according to some embodiments of the present disclosure.

FIG. 10 depicts a block diagram of a BS according to the embodiments of the present disclosure. The BS may include a receiving circuitry, a processor, and a transmitting circuitry. In one embodiment, the BS further includes a non-transitory computer-readable medium having stored thereon computer-executable instructions. The processor is coupled to the non-transitory computer-readable medium, the receiving circuitry and the transmitting circuitry. The computer-executable instructions can be programmed to implement operations (e.g. operations performed by BS in any of FIGS.

4-7) with the receiving circuitry, the transmitting circuitry and the processor. That is, upon performing the computer-executable instructions, the transmitting circuitry may transmit, to a UE, a first indicator requesting the UE to share a COT for downlink transmission within the COT, wherein the COT is initiated by the UE for transmitting uplink data; and the receiving circuitry may receive, from the UE, the uplink data within the COT.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method performed by a user equipment (UE) for wireless communication, comprising:
   receiving, from a base station (BS), a radio resource control (RRC) signaling including a first indicator requesting the UE to share a channel occupancy time (COT) for downlink transmission within the COT, wherein the COT is initiated by the UE for transmitting uplink data;
   determining a first channel access priority class (CAPC) value;
   transmitting, to the BS and subsequent to the first indicator, a second indicator indicating whether the COT is to be shared for the downlink transmission;
   initiating the COT by performing a channel access procedure using the first CAPC value; and
   transmitting, to the BS, at least a part of the uplink data in the COT.

2. The method of claim 1, wherein determining the first CAPC value comprises:
   receiving the first CAPC value from the BS.

3. The method of claim 2, wherein the first CAPC value is indicated in one of: downlink control information (DCI) scheduling one or more PUSCHs for transmitting the uplink data, downlink feedback information (DFI) corresponding to one or more configured grant PUSCHs for transmitting the uplink data, or a radio resource control (RRC) signaling.

4. A user equipment (UE) for wireless communication, comprising:
   at least one memory; and
   at least one processor coupled with the at least one memory and configured to cause the UE to:
      receive, from a base station (BS), a radio resource control (RRC) signaling including a first indicator requesting the UE to share a channel occupancy time (COT) for downlink transmission within the COT, wherein the COT is initiated by the UE for transmitting uplink data;
      determine a first channel access priority class (CAPC) value;
      transmit, to the BS and subsequent to the first indicator, a second indicator indicating whether the COT is to be shared for the downlink transmission;
      initiate the COT by performing a channel access procedure using the first CAPC value; and
      transmit, to the BS, at least a part of the uplink data in the COT.

5. The UE of claim 4, wherein the at least one processor is further configured to cause the UE to:
   receive, from the BS, a third indicator indicating a duration requested for the downlink transmission.

6. The UE of claim 5, wherein the third indicator is included in one of: downlink control information (DCI) scheduling one or more physical uplink shared channels (PUSCHs) for transmitting the uplink data, downlink feedback information (DFI) corresponding to one or more configured grant PUSCHs for transmitting the uplink data, DCI for activating the one or more configured grant PUSCHs for transmitting the uplink data, or a radio resource control (RRC) signaling.

7. The UE of claim 5, wherein in response to a duration of the COT being shorter than a sum of a duration required for transmitting the uplink data and the duration requested for the downlink transmission, the uplink data is prioritized.

8. The UE of claim 5, wherein the at least one processor is further configured to cause the UE to:
   receive, from the BS, a first signalling indicating which of the uplink data and the downlink transmission is prioritized,
   wherein in response to a duration of the COT being shorter than a sum of a duration required for transmitting the uplink data and the duration requested for the downlink transmission and the uplink data being prioritized, all the uplink data is to be transmitted in the COT; and
   wherein in response to a duration of the COT being shorter than a sum of a duration required for transmitting the uplink data and the duration requested for the downlink transmission and the downlink transmission being prioritized, a part of the uplink data is to be transmitted in the COT.

9. The UE of claim 5, wherein the at least one processor is further configured to cause the UE to:

select the first CAPC value from a set of predefined CAPC values according to a sum of a duration required for transmitting the uplink data and the duration requested for the downlink transmission.

10. The UE of claim 4, wherein the at least one processor is further configured to cause the UE to:
transmit, to the BS, the first CAPC value.

11. The UE of claim 10, wherein the first CAPC value is indicated by puncturing resource elements (REs) of a physical uplink shared channel (PUSCH) carrying the uplink data.

12. The UE of claim 10, wherein the first CAPC value is multiplexed with uplink shared channel (UL-SCH) carrying the uplink data.

13. The UE of claim 10, wherein the first CAPC value is indicated in a physical uplink control channel (PUCCH).

14. The UE of claim 10, wherein the first CAPC value is included in uplink control information (UCI) associated to a physical uplink shared channel (PUSCH) carrying the uplink data.

15. The UE of claim 4, wherein a number of symbols immediately preceding the downlink transmission are blanked.

16. The UE of claim 4, wherein the at least one processor is further configured to cause the UE to:
determine, in response to receiving the first indicator, whether to share the COT with the BS based at least in part on the CAPC value.

17. A base station for wireless communication, comprising:
at least one memory; and
at least one processor coupled with the at least one memory and configured to cause the base station to:
transmit, to a user equipment (UE), a radio resource control (RRC) signaling including a first indicator requesting the UE to share a channel occupancy time (COT) for downlink transmission within the COT, wherein the COT is initiated by the UE for transmitting uplink data;
receive, from the UE and subsequent to the first indicator, a second indicator indicating whether the COT is to be shared for the downlink transmission; and
receive, from the UE, the uplink data within the COT.

18. A processor for wireless communication, comprising:
at least one controller coupled with at least one memory and configured to cause the processor to:
receive, from a base station (BS), a radio resource control (RRC) signaling including a first indicator requesting the processor to share a channel occupancy time (COT) for downlink transmission within the COT, wherein the COT is initiated by the processor for transmitting uplink data;
determine a first channel access priority class (CAPC) value;
transmit, to the BS and subsequent to the first indicator, a second indicator indicating whether the COT is to be shared for the downlink transmission;
initiate the COT by performing a channel access procedure using the first CAPC value; and
transmit, to the BS, at least a part of the uplink data in the COT.

19. The processor of claim 18, wherein the at least one controller is further configured to cause the processor to:
transmit, to the BS, the first CAPC value.

20. The processor of claim 19, wherein the first CAPC value is included in uplink control information (UCI) associated to a physical uplink shared channel (PUSCH) carrying the uplink data.

* * * * *